(No Model.)
I. M. HOFFMAN.
REFRIGERATOR WAGON.
No. 321,970. Patented July 14, 1885.
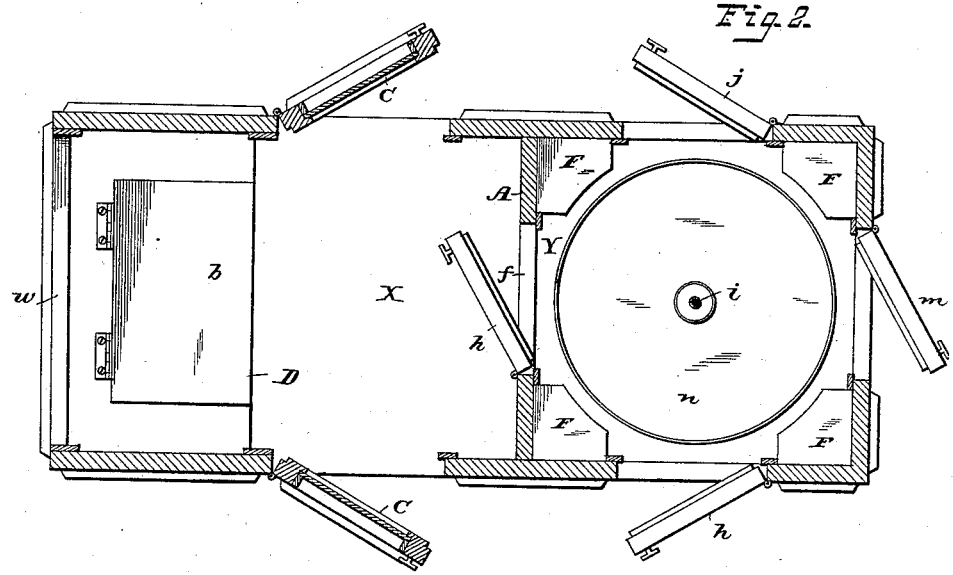
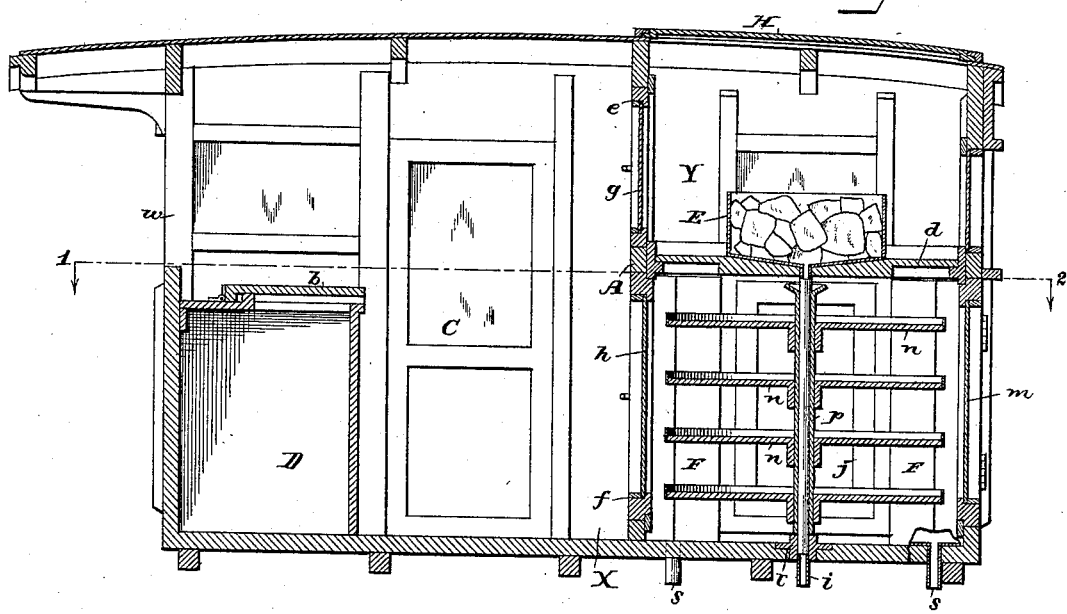

UNITED STATES PATENT OFFICE.

IRENIAS M. HOFFMAN, OF INDIANAPOLIS, INDIANA.

REFRIGERATOR-WAGON.

SPECIFICATION forming part of Letters Patent No. 321,970, dated July 14, 1885.

Application filed May 9, 1885. (No model.)

*To all whom it may concern:*

Be it known that I, IRENIAS M. HOFFMAN, a citizen of the United States, residing at Indianapolis, in the county of Marion and State of Indiana, have invented certain new and useful Improvements in Refrigerator-Wagons, of which the following is a specification.

My invention relates to that class of wagons used for carrying articles to be sold in the streets or roads; and my invention consists in providing the wagon with a driver's compartment and a refrigerating-compartment, and with shelves and doors, all as fully set forth hereinafter, so as to facilitate access to the refrigerating-chamber for the purpose of removing the articles to be sold, and so as to preserve the desired low temperature notwithstanding the necessity of opening the doors.

In the drawings, Figure 1 is a longitudinal section of the sales-wagon illustrating my improvement. Fig. 2 is a sectional plan on the line 1 2, Fig. 1.

The body of the wagon is divided by a cross-partition, A, to form two compartments, X Y, the former being forward of the partition and constituting the driver's compartment, in which he sits when the vehicle is in motion, and the latter being at the rear of the partition and constituting the refrigerating-chamber.

Access may be had to the driver's compartment X by means of side doors, C C, and at the forward end of this compartment is a chest, D, provided with a lid, $b$, above which is an opening, $w$, for the passage of the reins, and through which the driver can see the road and the animal attached to the vehicle.

The refrigerating-compartment Y may consist of a single chamber. I prefer, however, to divide it by a horizontal partition, $d$, into two chambers, the upper of which is shallow, and access may be had to the chambers through openings $e f$, provided with doors $g h$, opening into the chamber X.

Access may be had to the chamber Y at the end and sides of the vehicle through side and rear openings provided with doors $j k m$.

The refrigerating-chamber is provided with a series of shelves, $n$, preferably circular in form and connected to a hollow shaft or tube, $p$, and turning on the pipe $a'$, and having a bearing on a step, $r$, and in the chamber Y above the partition $d$, and, preferably, resting thereon, is an ice-box, E, the drip-pipe $i$ of which extends through the chamber to the bottom of the wagon, so that the drip-water from the ice-box flows through the same and is discharged below the bottom of the vehicle. The cold air from the ice-box E is permitted to flow downward by perforating the shelves $n$; but as the ice-box E alone will not in many instances preserve a sufficiently low temperature within the refrigerating-chamber, I provide four receptacles or ice-boxes, F, each of which is adapted to one of the corners of the refrigerating-chamber, and is provided with a curved side nearly in contact with the edges of the shelves.

The ice-boxes may be secured permanently in position, but are preferably placed detachably in the refrigerating-chamber, with their drip-pipes $s$ extending through openings in the bottom of the wagon, and the partition $d$ is preferably detachable, and the top of the wagon above the chamber Y is provided with a detachable cover, H, fitting an opening, $v$, through which the partition $d$ may be withdrawn, either to permit access to the receptacle below or to fill the ice-boxes, or for any other purpose.

By arranging the ice-boxes F in the corners of the chamber Y, as described, and by placing the doors $j k m$ between the ice-boxes, I am enabled to gain access to the shelves from either side or the end of the vehicle without opening the receptacle to any considerable extent, so that there will be but little loss of the cold air when either of the said doors are opened, and by supporting the shelves upon a central shaft they may be revolved, so as to readily bring any article in position to be inspected or removed through any of the doors.

By placing the circular ice-boxes at equal distances around the shelves, I am enabled to bring the ice in close proximity to the shelves without using ice-receptacles of too great a size to be readily handled or economically employed.

By placing the driver's compartment in front of the refrigerating-compartment and providing the doors $h$ C C and the openings $w$, the driver is enabled to occupy a position to see the road, control the animal, obtain ready access to the refrigerating-chamber, and deal with his customers without leaving the vehicle.

By using the central ice-box, E, I am enabled to further reduce the temperature within the chamber below the partition d, and also cool the chamber above the partition to an extent sufficient to facilitate the keeping of many articles which do not require a very low temperature in order to preserve them; or one of the boxes, F, may extend to the top of the wagon to cool the upper chamber, and the box E may then be dispensed with.

The box D, in front of the driver's position, may be used for the storage of any articles which do not require to be refrigerated, or it may be made into an ice-box.

By providing the outer doors, j k m, of the vehicle with glass panels, I am enabled to expose the contents of the refrigerating-chamber in such a manner as to facilitate the sale of the same without increasing the temperature of the chamber or exposing the article to dust.

Without limiting myself to the precise construction and arrangement of parts shown, I claim—

1. A sales-wagon provided with two compartments, X Y, separated by a transverse partition having a door therein, the rear compartment having shelves revolving upon a vertical axis, and provided at the corners with ice-boxes F, substantially as set forth.

2. A sales-wagon divided by a transverse partition provided with a door, and having doors at the sides and end, in combination with a series of revolving shelves and with ice-boxes arranged in proximity to the shelves and between the doors, substantially as set forth.

3. A sales-wagon provided with a driver's compartment, X, and a refrigerating-compartment, Y, divided by a partition and containing shelves, and vertical ice-boxes F in the lower portion and an ice-box in the upper portion, substantially as set forth.

4. A sales-wagon provided with a refrigerating-compartment having an opening at the top and a detachable cover, H, a removable partition, d, and shelves and ice-boxes below said partition, substantially as and for the purpose set forth.

In testimony whereof I have signed my name to this specification in the presence of two subscribing witnesses.

IRENIAS M. HOFFMAN.

Witnesses:
CHARLES E. FOSTER,
F. L. FREEMAN.